US012682124B2

(12) United States Patent
Ito

(10) Patent No.: US 12,682,124 B2
(45) Date of Patent: Jul. 14, 2026

(54) SEMICONDUCTOR DEVICE AND CONTROL METHOD THEREOF

(71) Applicant: Renesas Electronics Corporation, Tokyo (JP)

(72) Inventor: Kenichi Ito, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 0 days.

(21) Appl. No.: 18/767,433

(22) Filed: Jul. 9, 2024

(65) Prior Publication Data

US 2025/0021701 A1      Jan. 16, 2025

(30) Foreign Application Priority Data

Jul. 14, 2023    (JP) ................................. 2023-115953

(51) Int. Cl.
　　*G06F 21/72* 　　(2013.01)
　　*G06F 21/79* 　　(2013.01)
　　*G06F 21/85* 　　(2013.01)

(52) U.S. Cl.
　　CPC .............. *G06F 21/72* (2013.01); *G06F 21/79* (2013.01); *G06F 21/85* (2013.01)

(58) Field of Classification Search
　　CPC ........... G06F 21/72; G06F 21/79; G06F 21/85
　　See application file for complete search history.

(56) References Cited

U.S. PATENT DOCUMENTS

2012/0198265 A1*  8/2012  Hein ..................... G11C 7/1051
　　　　　　　　　　　　　　　　　　　　　713/400
2012/0210133 A1*  8/2012  Nagai ................... H04L 9/0643
　　　　　　　　　　　　　　　　　　　　　713/168
2023/0291545 A1*  9/2023  Cap .......................... G06F 21/64

OTHER PUBLICATIONS

P. Lapczynski, "Introducing #3 Secure Boot in the in-vehicle Mcu RH850 and in-vehicle SOC R-Car that realizes Root of Trust," available at https://www.renesas.com/jp/ja/blogs/achieving-root-trust-secure-boot-automotive-rh850-and-r-car-devices-part-3, Jan. 1, 2024, concise explanation of relevance of which is found in the specification on pp. 1 and 2.

* cited by examiner

*Primary Examiner* — Hany S. Gadalla
(74) *Attorney, Agent, or Firm* — Rimon P.C.

(57) ABSTRACT

To provide a semiconductor device and a control method for a semiconductor device that realizes high-speed processing. The semiconductor device includes a storage unit, an encryption processing unit, and a hash processing unit. The data stored in the storage unit is transferred to the encryption processing unit for each pre-calculation data of the first calculation unit, the encryption processing unit applies the calculation processing to generate post-calculation data. The generated first calculation unit of the post-calculation data is transferred to the hash processing unit, the hash processing unit applies the hash calculation process to the post-calculation data of the second calculation unit. The post-calculation data is transferred to the storage unit, and the calculation processing and the hash calculation processing are performed in parallel.

15 Claims, 10 Drawing Sheets

SEMICONDUCTOR DEVICE AND CONTROL METHOD THEREOF

CROSS-REFERENCE TO RELATED APPLICATIONS

The disclosure of Japanese Patent Application No. 2023-115953 filed on Jul. 14, 2023, including the specification, drawings and abstract is incorporated herein by reference in its entirety.

BACKGROUND

This disclosure relates to a semiconductor device, a control method for a semiconductor device, and a control program for a semiconductor device.

There are disclosed techniques listed below.

[Non Patent Document 1] "Introduction of Secure Boot in automotive MCU RH850 and automotive SOC R-Car realizing Root of Trust #3", [online], Dec. 21, 2021, [searched May 1, 2023], Internet <https://www.renesas-.com/jp/ja/blogs/achieving-root-trust-secure-boot-automotive-rh850-and-r-car-devices-part-3>

Non Patent Document 1 discloses the outline of the mechanism of Secure Boot. The Secure Boot sequence may have the following steps.

Step 1. The device is reset.

Step 2. The device executes the Mask ROM. If the device's security is enabled, Secure Boot is executed.

Step 3. The Mask ROM loads certificates and content from external flash.

Step 4. The Mask ROM analyzes the root key certificate and extracts the root key. The root key hash is calculated and compared with the known root key hash (HBK). If the key is correct, proceed to the next step.

Step 5. The Mask ROM compares the hash of the boot key in the Secure Boot content certificate with the Secure Boot key hash in the root key certificate (confirmed in the previous step). If the check is successful, the signature of the Secure Boot content certificate is verified using the public key. If the Secure Boot content certificate is valid, the validity and integrity of the next boot stage are calculated using the data of the content certificate. If all verifications were correct, jump to the next boot stage.

SUMMARY

"Optionally decrypt data with KCE" in FIG. 1 indicates the decryption process of the encryption processing unit. Also, in the verification (Verify) process such as "Check root key with HBK" in Step 4 and "Content Verification" in Step 5 in FIG. 1, the first process of verification indicates the hash operation by the hash processing unit. In this way, if a hash operation is performed after the decryption process, there is a risk that the processing time will be long. It is desired to speed up the processing of Secure Boot and the like.

Other objects and novel features will become apparent from the description of this specification and the accompanying drawings.

According to one embodiment, a semiconductor device comprises a storage part for storing at least one of plaintext and ciphertext, a cryptographic processing part for performing computational processing including encryption of the plaintext and decryption of the ciphertext, and a hash processing part having a buffer and performing hash computation processing for calculating a hash value. The computational processing data before processing, which includes at least one of the plaintext and the ciphertext stored in the storage part, is transferred to the cryptographic processing part for each first computational unit. The cryptographic processing part applies the computational processing to the transferred first computational unit of the computational processing data before processing, and generates the computational processing data after processing, which includes at least one of the ciphertext and the plaintext, for each first computational unit. The generated first computational unit of the computational processing data after processing is transferred to the hash processing part. The hash processing part stores the transferred first computational unit of the computational processing data after processing in the buffer, and applies the hash computation processing to the computational processing data after processing of the second computational unit of the hash processing part. The computational processing data after processing of the first computational unit or the second computational unit is transferred to the storage part. The computational processing and the hash computation processing are performed in parallel, and the transfer of the computational processing data after processing to the storage part, the computational processing, and the hash computation processing are repeated multiple times. The hash value corresponding to the computational processing data after processing, which has been processed from the computational processing data before processing, is output to the storage part.

According to one embodiment, a method for controlling a semiconductor device comprises a storage part for storing at least one of plaintext and ciphertext, a cryptographic processing part for performing computational processing including encryption of the plaintext and decryption of the ciphertext, and a hash processing part having a buffer and performing hash computation processing for calculating a hash value. The method for controlling the semiconductor device includes first step of transferring the computational processing data before processing, which includes at least one of the plaintext and the ciphertext stored in the storage part, to the cryptographic processing part for each first computational unit, a second step of applying the computational processing in the cryptographic processing part to the transferred first computational unit of the computational processing data before processing, and generating the computational processing data after processing, which includes at least one of the ciphertext and the plaintext, for each first computational unit, a third step of transferring the generated first computational unit of the computational processing data after processing to the hash processing part, a fourth step of storing the transferred first computational unit of the computational processing data after processing in the buffer of the hash processing part, a fifth step of applying the hash computation processing in the hash processing part to the computational processing data after processing of the second computational unit of the hash processing part, and a sixth step of transferring the computational processing data after processing of the first computational unit or the second computational unit to the storage part. The method further includes performing the second step and the fifth step in parallel, repeating the first step to the fifth step multiple times, and outputting the hash value corresponding to the computational processing data after processing, which has been processed from the computational processing data before processing, to the storage part.

According to one embodiment, a control program for a semiconductor device includes a memory part for storing at least one of plaintext and ciphertext, a cryptographic processing part for performing arithmetic processing including encryption of the plaintext and decryption of the ciphertext, and a hash processing part with a buffer, which performs hash calculation processing. The control program for the semiconductor device includes a first step of transferring pre-calculation data containing at least one of the plaintext and the ciphertext stored in the memory part to the cryptographic processing part for each first calculation unit, a second step of applying the arithmetic processing to the transferred first calculation unit of the pre-calculation data in the cryptographic processing part, and generating a first calculation unit of post-calculation data containing at least one of the ciphertext and the plaintext, a third step of transferring the generated first calculation unit of post-calculation data to the hash processing part, a fourth step of storing the transferred first calculation unit of post-calculation data in the buffer of the hash processing part, a fifth step of applying the hash calculation processing to the second calculation unit of the post-calculation data in the hash processing part, and a sixth step of transferring the first calculation unit of post-calculation data or the second calculation unit of post-calculation data to the memory part. The computer is made to execute these steps, perform the second step and the fifth step in parallel, repeat the first step to the fifth step multiple times, and further execute a step of outputting the hash value corresponding to the post-calculation data that the pre-calculation data has been calculated to the memory part.

According to the one embodiment, it is possible to provide a semiconductor device, a control method for a semiconductor device, and a control program for a semiconductor device that can achieve high-speed processing.

DETAILED DESCRIPTION

Figure 1:
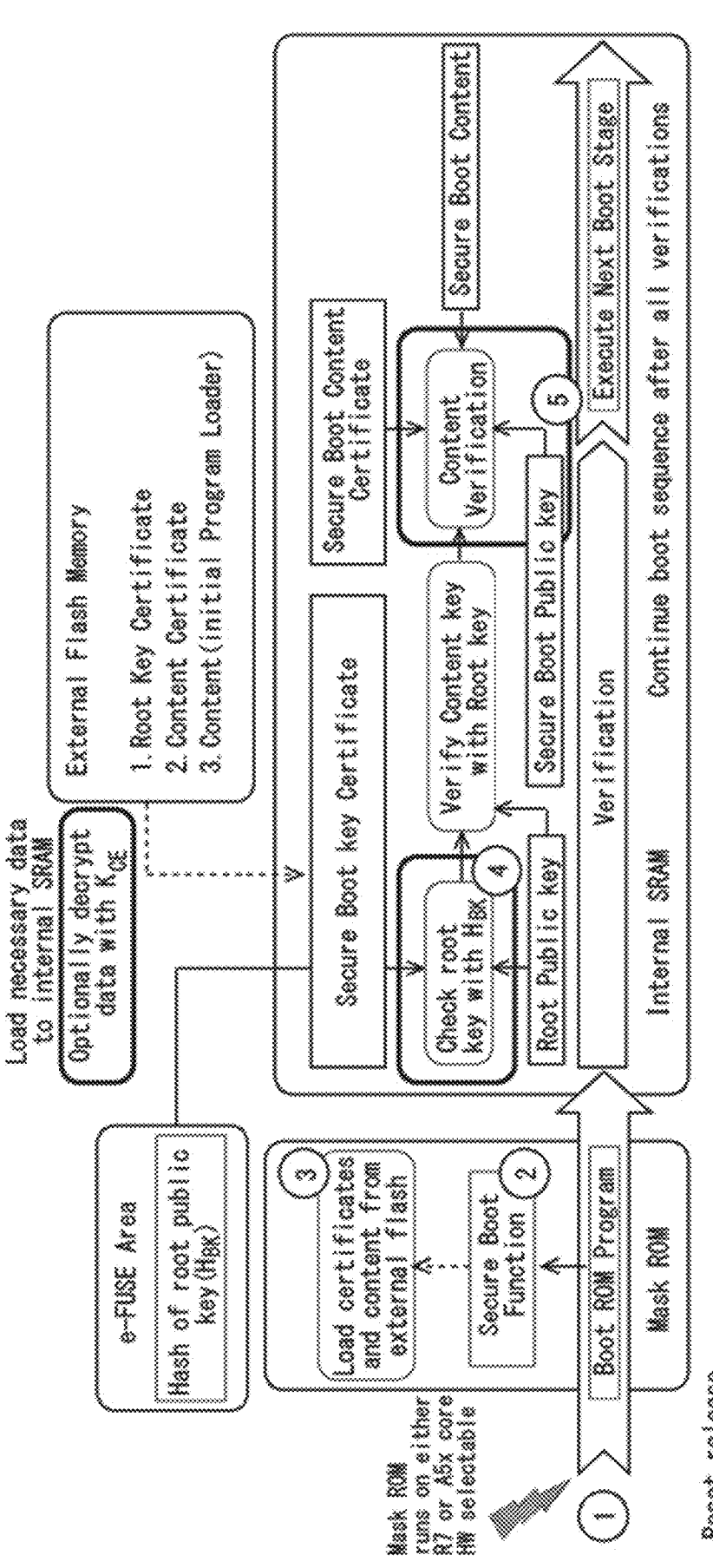
FIG. 1 is a diagram illustrating an overview of the secure boot mechanism.

For the sake of clarity of explanation, the following description and drawings are appropriately omitted and simplified. In each drawing, the same elements are given the same reference numerals, and redundant explanations are omitted as necessary.

The semiconductor device according to the comparative example is explained. Then, the newly identified problem by the inventor is explained with respect to the semiconductor device of the comparative example. Then, the semiconductor device and its control method according to each embodiment are explained. In each embodiment, the modified example is also explained. Note that the semiconductor device according to the comparative example is also included in the scope of the technical idea of the embodiment.

Comparative Example

Figure 2:
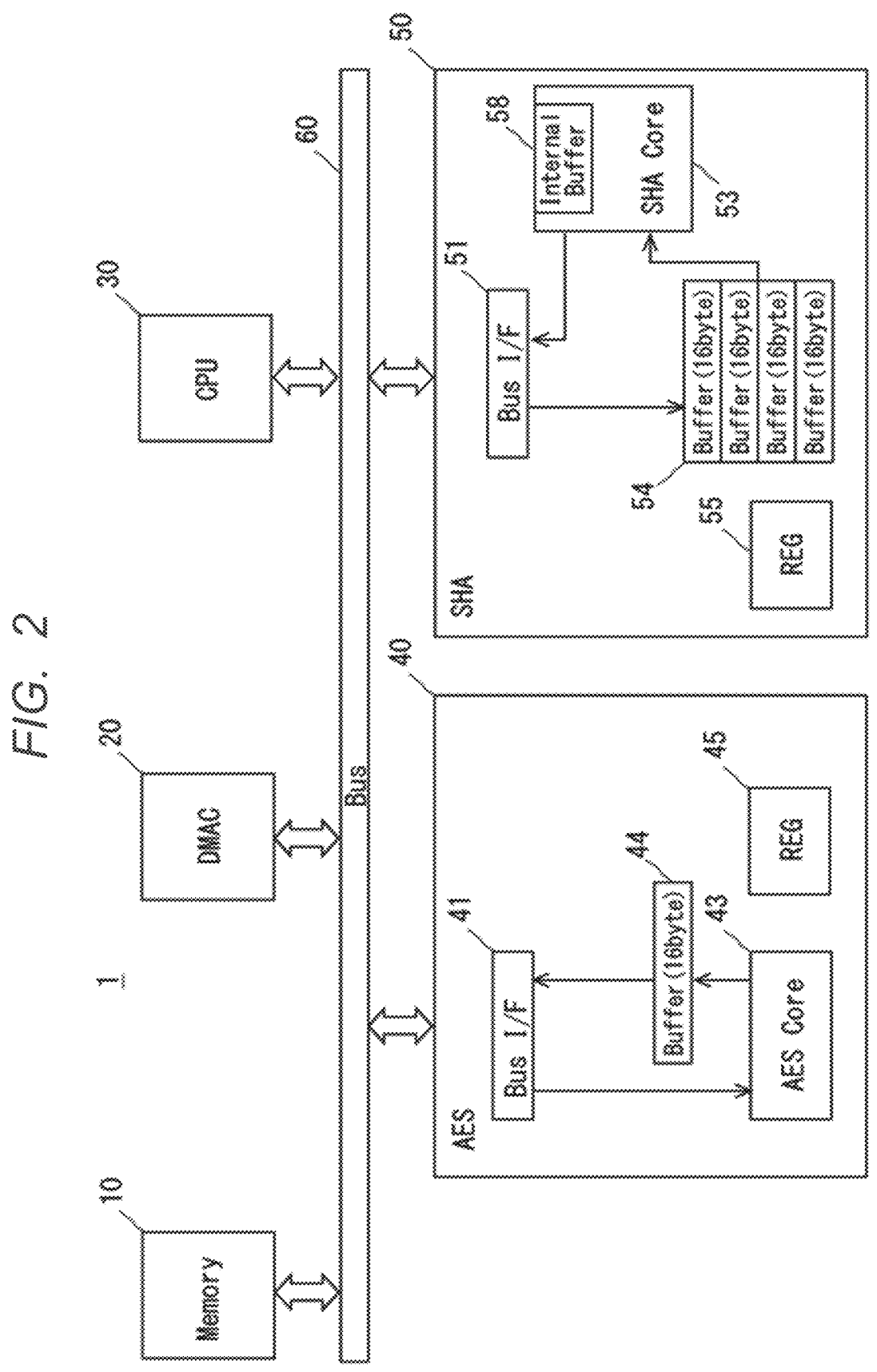
FIG. 2 is a block diagram illustrating a semiconductor device according to a comparative example.

The semiconductor device according to the comparative example is explained. FIG. 2 is a block diagram illustrating a semiconductor device 1 according to a comparative example. As shown in FIG. 2, the semiconductor device 1 includes a memory section (Memory) 10, a transfer section (Direct Memory Access Controller, DMAC) 20, a control section (Central Processing Unit, CPU) 30, an encryption processing section (Advanced Encryption Standard, AES) 40, a hash processing section (Secure Hash Algorithm, SHA) 50, and a bus (Bus) 60. The names in parentheses for each section are examples and do not imply limitation. The same applies to the names in parentheses for each section below. The bus 60 connects the memory section 10, the transfer section 20, the control section 30, the encryption processing section 40, and the hash processing section 50 in a communicable manner.

The memory section 10 stores data including at least one of plaintext and ciphertext. The memory section 10 may store ciphertext that has been encrypted from plaintext and plaintext that has been decrypted from ciphertext, and may also store hash values of plaintext and ciphertext. The memory section 10 is connected to the bus 60 in a communicable state. The memory section 10 can communicate with the transfer section 20, the control section 30, the encryption processing section 40, and the hash processing section 50 via the bus 60.

The transfer section 20 performs data transfer. The transfer section 20 is connected to the bus 60 in a communicable state. The transfer section 20 can communicate with the memory section 10, the control section 30, the encryption processing section 40, and the hash processing section 50 via the bus 60. The transfer section 20 transfers data including at least one of plaintext and ciphertext stored in the memory section 10 to the encryption processing section 40. When the transfer section 20 transfers data stored in the memory section 10 to the encryption processing section 40, it may transfer the data to the encryption processing section 40 in units of the operation unit of the encryption processing section 40. The operation unit of the encryption processing section 40 is referred to as the first operation unit. The first operation unit is, for example, 16 bytes. The first operation unit is not limited to 16 bytes and may be changed according to the performance of each section of the semiconductor device 1.

Hereinafter, data before operation processing in the encryption processing section 40 is referred to as pre-operation processing data. Therefore, the pre-operation processing data includes at least one of plaintext and ciphertext stored in the memory section 10. Data after operation processing in the encryption processing section 40 is referred to as post-operation processing data. Therefore, the post-operation processing data includes at least one of ciphertext that has been encrypted from plaintext in the encryption processing section 40 and plaintext that has been decrypted from ciphertext in the encryption processing section 40. The memory section 10 stores the pre-operation processing data and the post-operation processing data.

The transfer section 20 performs transfer of the pre-operation processing data and the post-operation processing data. The transfer section 20 transfers the pre-operation processing data stored in the memory section 10 to the encryption processing section 40 in units of the first operation unit via the bus 60. As a result, the pre-operation processing data including at least one of plaintext and ciphertext stored in the memory section 10 is transferred to the encryption processing section 40 in units of the first operation unit.

The control section 30 controls the memory section 10, the transfer section 20, the encryption processing section 40, and the hash processing section 50. The control section 30 is connected to the bus 60 in a communicable state. The control section 30 can communicate with the memory section 10, the transfer section 20, the encryption processing section 40, and the hash processing section 50 via the bus 60. The control section 30 includes a processor such as a CPU. The processor of the control section 30 can control the semiconductor device 1 by executing a control program that programs the control method of the semiconductor device 1.

The encryption processing section 40 performs operation processing including encryption of plaintext and decryption of ciphertext. The encryption processing section 40 is connected to the bus 60 in a communicable state. The encryption processing section 40 can communicate with the memory section 10, the transfer section 20, the control section 30, and the hash processing section 50 via the bus 60. The encryption processing section 40 applies operation processing to the pre-operation processing data of the first operation unit transferred from the memory section 10. Accordingly, the encryption processing unit 40 generates post-calculation data containing at least one of the calculated ciphertext and plaintext for the first calculation unit. The encryption processing unit 40 includes a bus port (Bus I/F, bus interface) 41, an AES core 43, a buffer (Buffer) 44, and a register (REG) 45.

The bus port 41 performs input of pre-calculation data and output of post-calculation data between the bus 60. The encryption processing unit 40 receives the pre-calculation data of the first calculation unit at the bus port 41. The encryption processing unit 40 outputs the post-calculation data of the first calculation unit from the bus port 41 to the bus 60.

The AES core 43 performs actual calculation processing including encryption processing and decryption processing on the pre-calculation data received at the bus port 41. The AES core 43 outputs the calculated post-calculation data to the buffer 44. The post-calculation data is output from the buffer 44 to the bus 60 via the bus port 41.

The transfer unit 20 transfers the post-calculation data of the first calculation unit generated by the encryption processing unit 40 to the storage unit 10 via the bus 60. Therefore, the post-calculation data of the first calculation unit generated in the encryption processing unit 40 is transferred to the storage unit 10 via the bus 60. The transfer of pre-calculation data to the encryption processing unit 40, the calculation processing in the encryption processing unit 40, and the transfer of post-calculation data to the storage unit 10 are sequentially repeated for each pre-calculation data of the first calculation unit for the entire pre-calculation data stored in the storage unit 10.

The hash processing unit 50 performs hash calculation processing to calculate a hash value. The hash processing unit 50 is connected to the bus 60 in a communicable state. The hash processing unit 50 can communicate with the storage unit 10, the transfer unit 20, the control unit 30, and the encryption processing unit 40 via the bus 60. The hash processing unit 50 has a bus port 51, a SHA core 53, a buffer 54, a register 55, and an internal buffer 58. The bus port 51 performs input of post-calculation data and output of hash values between the bus 60. The post-calculation data received via the bus port 51 is stored in the buffer 54.

The buffer 54 sequentially stores the post-calculation data of the first calculation unit generated by the encryption processing unit 40. The buffer 54 stores the post-calculation data until it becomes the calculation unit of the hash processing unit 50. The calculation unit of the hash processing unit 50 is called the second calculation unit. The second calculation unit is, for example, 64 bytes. In addition, the second calculation unit is not limited to 64 bytes, and may be changed according to the performance of each part of the semiconductor device 1. The buffer 54 outputs the post-calculation data of the second calculation unit to the SHA core 53.

The SHA core 53 actually performs hash calculation processing on the post-calculation data of the second calculation unit received from the buffer 54. The SHA core 53 stores the hash value of the post-calculation data in the internal buffer 58. The SHA core 53 updates the hash value stored in the internal buffer 58 for each post-calculation data of the second calculation unit. The SHA core 53 updates the hash value for each post-calculation data of the second calculation unit until the calculation of the hash value for the post-calculation data corresponding to the entire pre-calculation data stored in the storage unit 10 is completed. The SHA core 53 outputs the calculated hash value to the bus 60 via the bus port 51.

In this way, the hash processing unit 50 sequentially stores the post-calculation data of the first calculation unit transferred in the buffer 54. Then, the hash processing unit 50 applies hash calculation processing to the post-calculation data of the second calculation unit. Output a hash value corresponding to the entire post-calculation data to the bus 60. The transfer unit 20 transfers the hash value calculated in the hash processing unit 50 to the storage unit 10 via the bus 60. Therefore, a hash value corresponding to the processed data after the operation, which is the entire pre-operation processing data, is output to the storage unit 10. The hash operation processing of the post-operation processing data in the hash processing unit 50 and the update of the hash value of the internal buffer 58 are repeatedly performed for the entire post-operation processing data, for each second operation unit of the post-operation processing data.

Figure 3:
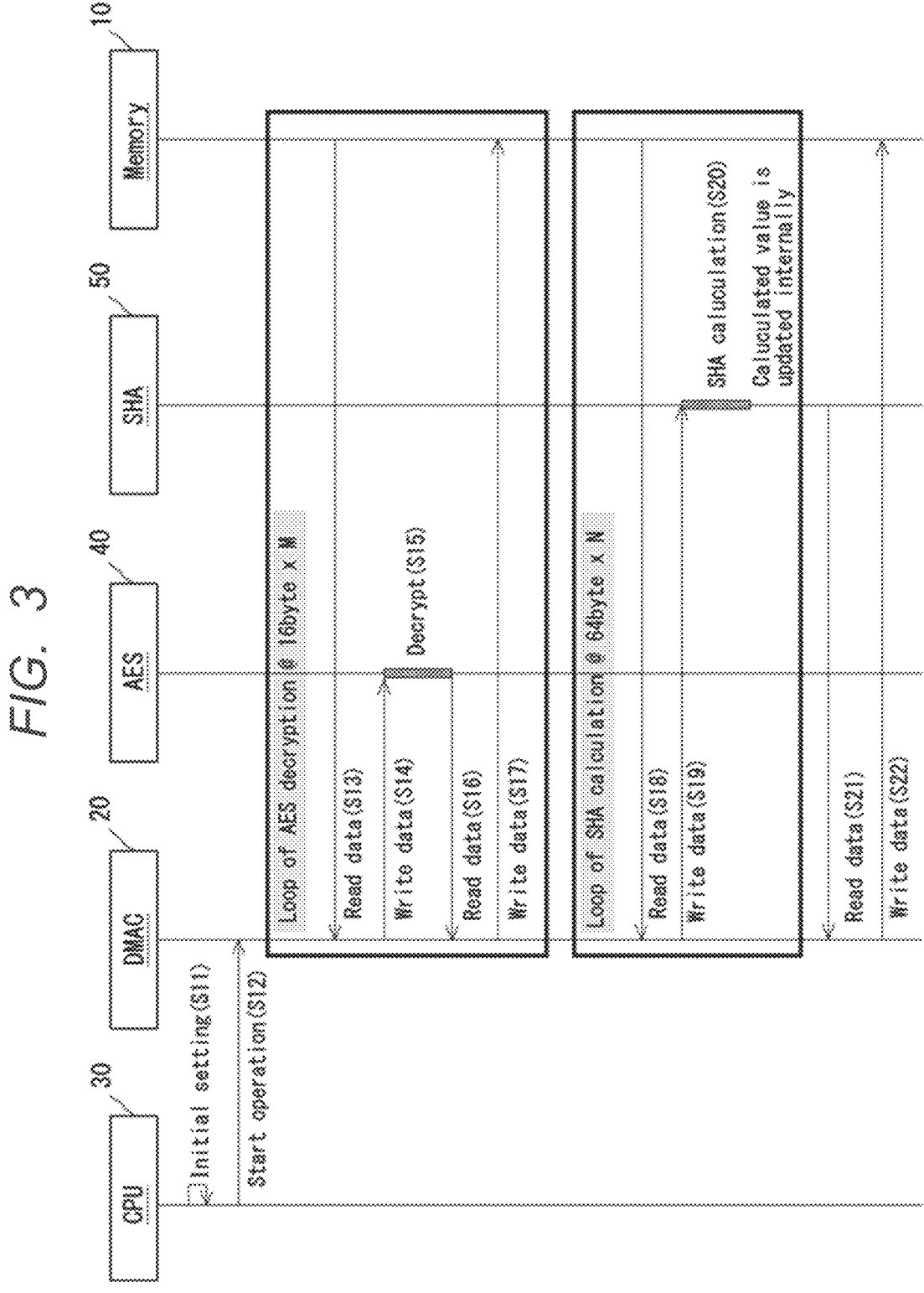
FIG. 3 is a sequence diagram illustrating the operation of the semiconductor device according to the comparative example.

Next, the operation of the semiconductor device 1 according to the comparative example will be described. FIG. 3 is a sequence diagram illustrating the operation of the semiconductor device 1 according to the comparative example. As shown in FIG. 3, the control unit 30 performs initial settings (step S11). Then, as described below, the control unit 30 starts the transfer of various data to the transfer unit 20, the operation processing for the encryption processing unit 40, and the hash processing for the hash processing unit 50 (step S12).

First, the control unit 30 performs a loop of the operation processing of the encryption processing unit 40. Specifically, the control unit 30 causes the transfer unit 20 to read a first operation unit of pre-operation processing data from the storage unit 10 (step S13). Next, the control unit 30 causes the transfer unit 20 to write the read first operation unit of pre-operation processing data to the encryption processing unit 40 (step S14). In this way, the pre-operation processing data stored in the storage unit 10, which includes at least one of plaintext and ciphertext, is sequentially transferred to the encryption processing unit 40 for each first operation unit.

Next, the control unit 30 causes the encryption processing unit 40 to apply operation processing to the first operation unit of pre-operation processing data (step S15). As a result, the encryption processing unit 40 generates a first operation unit of post-operation processing data.

Next, the control unit 30 causes the transfer unit 20 to read a first operation unit of post-operation processing data from the encryption processing unit 40 (step S16). Next, the control unit 30 causes the transfer unit 20 to write the read first operation unit of post-operation processing data to the storage unit 10 (step S17). In this way, the control unit 30 transfers the first operation unit of post-operation processing data to the storage unit 10. The control unit 30 repeats the operation processing of the encryption processing unit 40 from step S13 to step S17 for each first operation unit of pre-operation processing data, and performs it for the entire pre-operation processing data stored in the storage unit 10.

Next, the control unit 30 performs a loop of the hash operation processing of the hash processing unit 50. Specifically, the control unit 30 causes the transfer unit 20 to read a first operation unit of post-operation processing data from the storage unit 10 (step S18). Next, the control unit 30 causes the transfer unit 20 to write the read first operation unit of post-operation processing data to the hash processing unit 50 (step S19).

Next, the control unit 30 causes the hash processing unit 50 to apply hash operation processing to the second operation unit (the first operation unit stored until it becomes the second operation unit) of post-operation processing data (step S20). As a result, the hash processing unit 50 updates the hash value stored in the internal buffer 58 for each second operation unit of post-operation processing data. The control unit 30 repeats the hash operation processing from step S18 to step S20 for each second operation unit of post-operation processing data, and performs it for the entire post-operation processing data.

Next, the control unit 30 causes the transfer unit 20 to read the hash value calculated by the hash processing unit 50 from the hash processing unit 50 (step S21). Next, the control unit 30 causes the transfer unit 20 to write the hash value read from the hash processing unit 50 to the storage unit 10 (step S22).

In this way, the semiconductor device 1 of Comparative Example 1 performs operation processing on the pre-operation processing data stored in the storage unit 10 by the transfer unit 20 and the encryption processing unit 40. Then, the semiconductor device 1 outputs the post-operation processed data to the storage unit 10. Furthermore, the semiconductor device 1 performs a hash operation on the data stored in the storage unit 10 after the calculation process, by the transfer unit 20 and the hash processing unit 50. Then, the semiconductor device 1 outputs the calculated hash value to the storage unit 10.

(New Problem Found by the Inventor)

In the comparative example, the semiconductor device 1 performs a loop of the hash operation process of the hash processing unit 50 after the loop of the calculation process of the encryption processing unit 40. In this way, when the hash operation process is performed after the encryption and decryption process, there is a risk that the processing time may be prolonged.

Such a comparative example of a semiconductor device 1 has difficulty in meeting the required time for secure boot of the assumed program size with a predetermined hardware (HW) configuration. For example, the comparative example of the semiconductor device 1 requires a certain amount of time for secure boot depending on the assumed program size. On the other hand, when the time from power up to the start of communication reception is defined as a product, the required time allocated for secure boot may be shorter than the predetermined time considering the boot time of other systems. Therefore, the comparative example of the semiconductor device 1 has difficulty in meeting the required time for secure boot.

As the generation of semiconductor devices advances, the target program size increases. On the other hand, the boot time requirement remains unchanged. Therefore, it is becoming increasingly difficult to meet the required time relatively. Therefore, the comparative example of the semiconductor device 1 has difficulty in achieving high-speed processing.

First Embodiment

Next, the semiconductor device of this embodiment will be described. In the semiconductor device of this embodiment, the encryption processing unit transfers data after the sequential operation processing to the storage unit and the hash processing unit. The hash processing unit performs hash operations in parallel with the operation processing including encryption and decryption. This achieves high-speed processing. Since the operation units are different between the encryption processing unit and the hash processing unit, the semiconductor device of this embodiment is equipped with a mechanism to match the buffer and timing.

Figure 4:
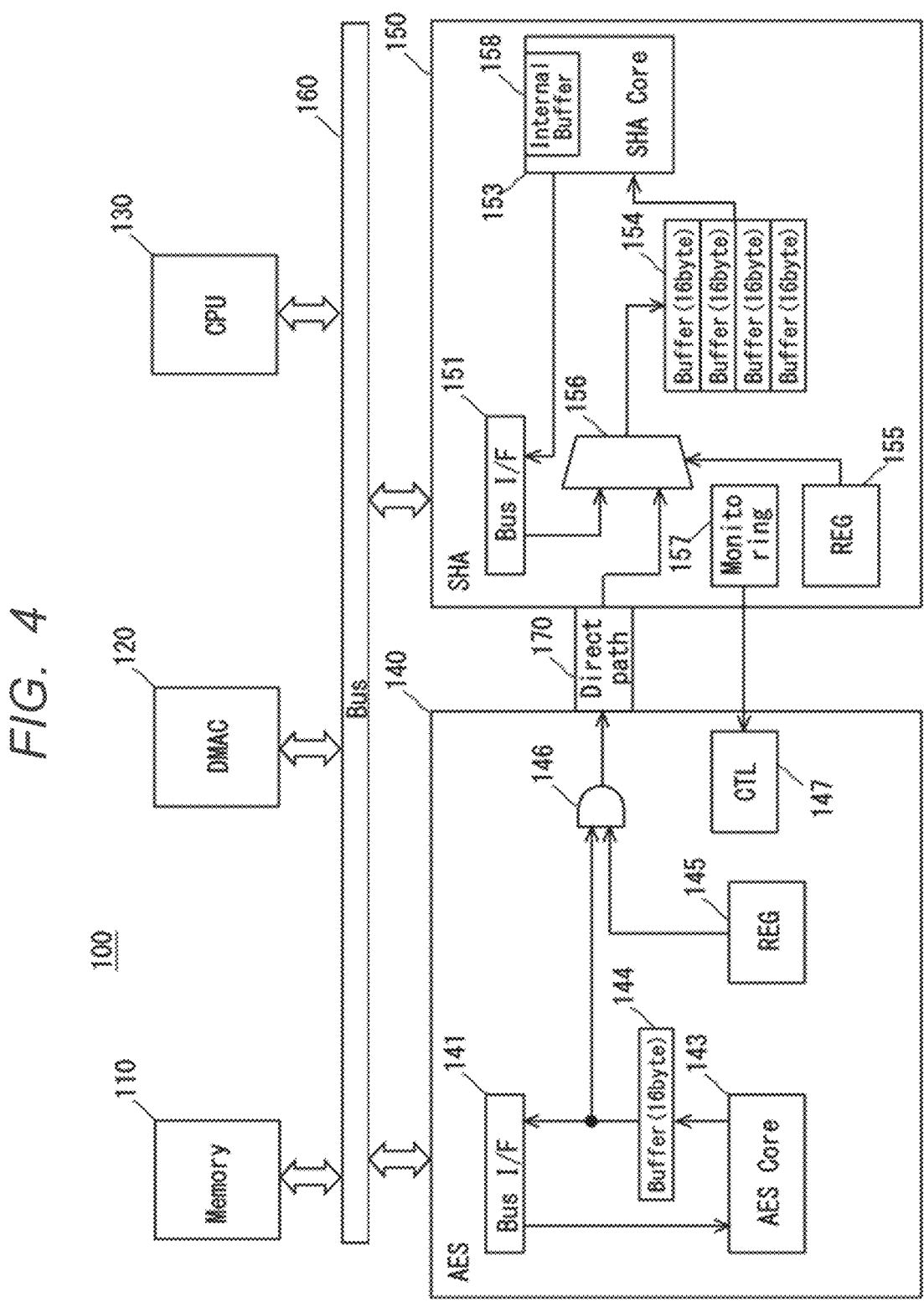
FIG. 4 is a block diagram illustrating a semiconductor device according to the first embodiment.

FIG. 4 is a block illustrating a semiconductor device 100 according to the first embodiment. As shown in FIG. 4, the semiconductor device 100 includes a storage unit 110, a transfer unit 120, a control unit 130, an encryption processing unit 140, a hash processing unit 150, a bus 160, and a direct path 170. The direct path 170 connects the encryption processing unit 140 and the hash processing unit 150 for communication. The direct path 170 is a route different from the bus 160.

The storage unit 110, the transfer unit 120, the control unit 130, and the bus 160 each have the same functions as the aforementioned storage unit 10, transfer unit 20, control unit 30, and bus 60.

First, an overview of the encryption processing unit 140 will be explained. The fact that the encryption processing unit 140 performs operation processing including encryption processing of plaintext and decryption processing of ciphertext is the same as the aforementioned encryption processing unit 40. In this embodiment, the transfer unit 120 transfers the operation processing data after the first operation unit generated in the encryption processing unit 140 to the storage unit 110 and the hash processing unit 150. In other words, the operation processing data after the first operation unit generated in the encryption processing unit 140 is transferred to the storage unit 110 and the hash processing unit 150.

The operation processing data after the first operation unit generated in the encryption processing unit 140 is output to the bus 160 and the direct path 170. The storage unit 110 receives the operation processing data after the first operation unit from the encryption processing unit 140 via the bus 160. The hash processing unit 150 receives the operation processing data after the first operation unit via the direct path 170. The hash processing unit 150 performs hash operation processing on the operation processing data received via the direct path 170.

Next, the details of the encryption processing unit 140 will be explained. The encryption processing unit 140 includes a bus port 141, an AES core 143, a buffer 144, a register 145, a control circuit 146, and a controller 147. The bus port 141 performs input of operation processing data before and output of operation processing data after between the bus 60. The encryption processing unit 140 receives the operation processing data before the first operation unit at the bus port 141. The encryption processing unit 140 outputs the operation processing data after the first operation unit from the bus port 141 to the bus 60.

The AES core 143 performs actual operation processing on the operation processing data before received via the bus port 141. The AES core 143 outputs the operation processing data after the operation processing to the buffer 144. The data after the arithmetic processing is outputted to the bus port 141 and the control circuit 146 from the buffer 144. The control circuit 146 outputs the data after the arithmetic processing to the connection path 170 depending on the value of the register 145. For example, when the value of the register 145 is a predetermined value, the control circuit 146 outputs the data after the arithmetic processing to the connection path 170. On the other hand, when the value of the register 145 is another value, the control circuit 146 does not output the data after the arithmetic processing to the connection path 170.

Thus, the encryption processing unit 140 has a switching means for switching between a mode for outputting the data after the arithmetic processing only to the bus 160 and a mode for outputting the data after the arithmetic processing to both the bus 160 and the connection path 170, depending on a predetermined setting. The switching means may include, for example, the control circuit 146. The controller 147 stops the output of the data after the arithmetic processing to at least one of the bus 160 and the connection path 170 when it receives a wait signal from the monitor 157 of the hash processing unit 150.

Next, the hash processing unit 150 will be described. The hash processing unit 150 performs a hash arithmetic processing to calculate a hash value. The hash processing unit 150 includes a bus port 151, a SHA core 153, a buffer 154, a register 155, a selector circuit 156, a monitor 157, and an internal buffer 158.

The bus port 151 performs input and output of the data after the arithmetic processing and output of the hash value between the bus 160. The hash processing unit 150 receives the data after the arithmetic processing of the first arithmetic unit at the bus port 151. The data after the arithmetic processing received at the bus port 151 is outputted to selector circuit 156.

The selector circuit 156 has multiple input terminals and one output terminal. One input terminal of the selector circuit 156 is connected to the bus port 151. The other input terminal of the selector circuit 156 is connected to the connection path 170. The selector circuit 156 inputs the data after the arithmetic processing of the first arithmetic unit from the bus port 151 and the connection path 170. Depending on the value of the register 155, the selector circuit 156 outputs either the data after the arithmetic processing inputted from the bus port 151 or the data after the arithmetic processing inputted from the connection path 170 to the buffer 154.

Thus, the hash processing unit 150 has a switching means for switching between a mode for performing hash arithmetic processing on the data after the arithmetic processing received via the bus 160 and a mode for performing hash arithmetic processing on the data after the arithmetic processing received via the connection path 170, depending on a predetermined setting. The switching means may include, for example, the selector circuit 156. The monitor 157 monitors the storage status of the buffer 154. When the buffer 154 cannot store additional data after the arithmetic processing, the monitor 157 outputs a wait signal to the encryption processing unit 140.

The buffer 154 sequentially stores the data after the arithmetic processing of the first arithmetic unit outputted from the selector circuit 156. Therefore, the hash processing unit 150 stores the data after the arithmetic processing of the first arithmetic unit transferred from the encryption processing unit 140 in the buffer 154. The buffer 154 stores the data after the arithmetic processing until it becomes the second arithmetic unit. The buffer 154 outputs the data after the arithmetic processing of the second arithmetic unit to the SHA core 153.

The SHA core 153 actually performs hash arithmetic processing on the data after the arithmetic processing of the second arithmetic unit received from the buffer 154. The SHA core 153 stores the hash value of the data after the arithmetic processing in the internal buffer 158. The SHA core 153 updates the hash value stored in the internal buffer 158 for each data after the arithmetic processing of the second arithmetic unit. The SHA core 153 updates the hash value for each data after the arithmetic processing of the second arithmetic unit until the calculation of the hash value for the entire data after the arithmetic processing corresponding to the entire data before the arithmetic processing stored in the storage unit 10 is completed. The SHA core 153 outputs the calculated hash value to the bus 160 via the bus port 151.

In this way, the hash processing unit 150 applies hash operation processing to the data after the second operation unit's processing. The hash value corresponding to the entire data after the operation is output to the bus 160. The transfer unit 120 transfers the hash value calculated in the hash processing unit 150 to the storage unit 110 via the bus 160. Therefore, the hash value corresponding to the entire data after the operation, which has been processed from the entire data before the operation, is output to the storage unit 110.

In the semiconductor device 100 of this embodiment, the operation processing of the encryption processing unit 140 and the hash operation processing of the hash processing unit 150 are performed in parallel. The capacity of the buffer 154 of the hash processing unit 150 is larger than the capacity of the buffer 144 of the encryption processing unit 140. For example, the capacity of the buffer 154 of the hash processing unit 150 is 64 bytes, and the capacity of the buffer 144 of the encryption processing unit 140 is 16 bytes. Therefore, the capacity of the buffer 154 of the hash processing unit 150 is four times the capacity of the buffer 144 of the encryption processing unit 140. In this way, by making the capacity of the buffer 154 of the hash processing unit 150 larger than the capacity of the buffer 144 of the encryption processing unit 140, the timing of the operation processing of the encryption processing unit 140 and the hash operation processing of the hash processing unit 150 can be matched and performed in parallel.

Also, the operation processing of the encryption processing unit 140, the hash operation processing of the hash processing unit 150, and the transfer of the data after the operation to the storage unit 110 are repeated multiple times. Specifically, the operation processing is performed on the entire data before the operation stored in the storage unit 10, and the hash value of the entire data after the operation is calculated and repeated multiple times.

The storage unit 110 repeatedly transfers the data after the operation of the first operation unit. Therefore, as a result of being repeated for the entire data before the operation, the storage unit 110 can obtain the entire data after the operation corresponding to the entire data before the operation. Also, the hash processing unit 150 repeatedly performs hash operation processing for each data after the operation of the second operation unit and updates the operation result. Therefore, as a result of the hash operation processing being repeated for the entire data after the operation, the hash processing unit 150 calculates the hash value of the entire data after the operation. The hash processing unit 150 outputs the hash value corresponding to the entire data after the operation to the storage unit 110. As a result, the storage unit 110 stores the entire data after the operation and its hash value.

Figure 5:
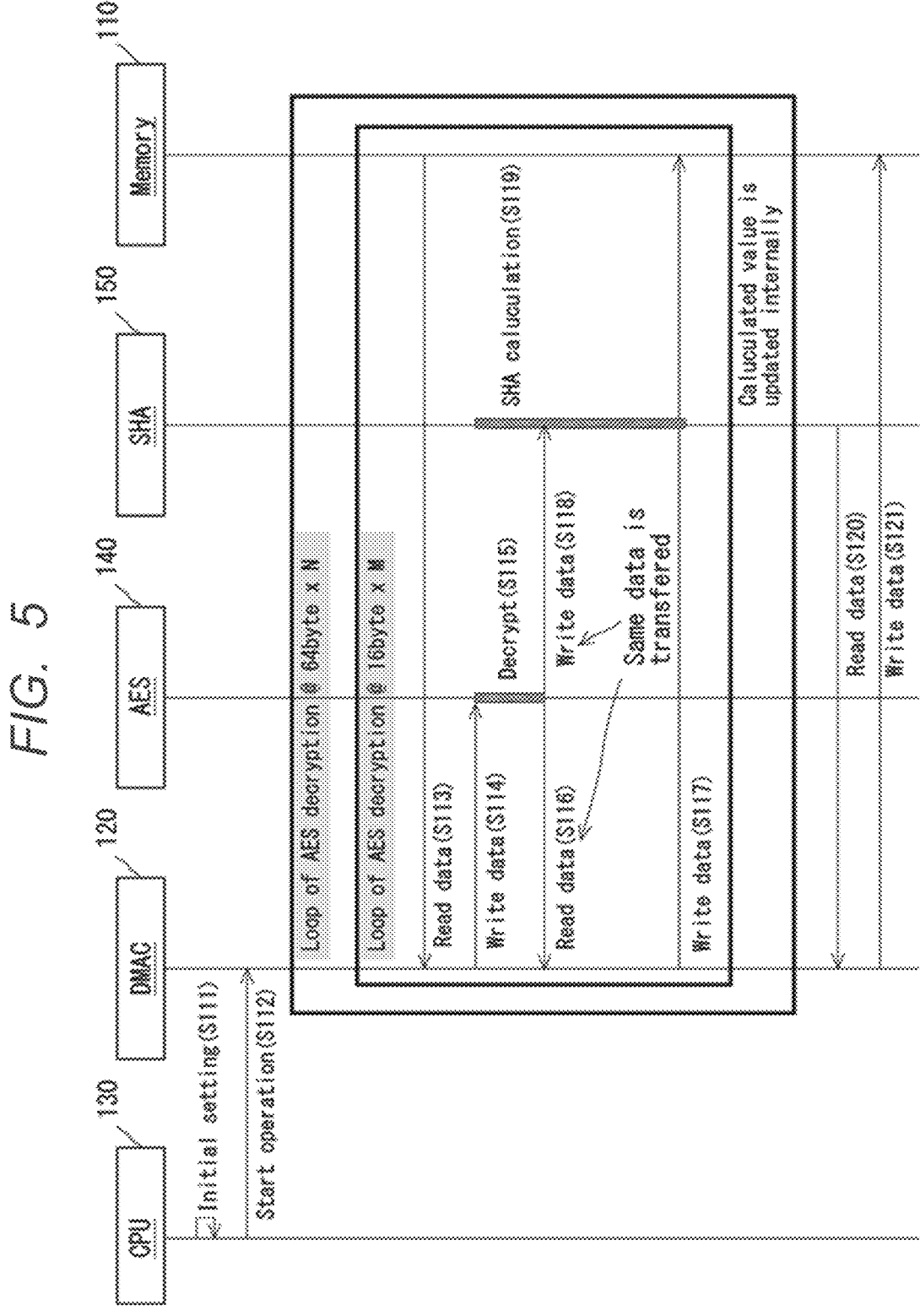
FIG. 5 is a sequence diagram illustrating the operation of the semiconductor device according to the first embodiment.

Next, the operation of the semiconductor device 100 according to the first embodiment will be described. FIG. 5 is a sequence diagram illustrating the operation of the semiconductor device 100 according to the first embodiment. As shown in FIG. 5, in the semiconductor device 100 of this embodiment, the operation processing of the encryption processing unit 140 and the hash operation processing of the hash processing unit 150 are performed in parallel.

Steps S111 to S117 are the same as the previously described steps S11 to S17, respectively.

The control unit 130 causes the transfer unit 120 to write the data after the operation of the first operation unit, which was generated by the encryption processing unit 140, into the hash processing unit 150 (step S118). Therefore, in steps S116 and S118, the same data after the operation of the first operation unit is transferred. The control unit 130 may cause the encryption processing unit 140 to transfer the data after the operation of the first operation unit to the hash processing unit 150. The hash processing unit 150 stores the transferred data after the operation of the first operation unit in the buffer 154.

In step S118, the data after the operation of the first operation unit may be output to the connection path 170. On the other hand, in steps S116 and S117, the data after the operation of the first operation unit may be output to the bus 160.

Next, the control unit 130 applies a hash operation to the post-calculation data of the second calculation unit to the hash processing unit 150 (step S119). In addition, the control unit 130 may cause the hash processing unit 150 to perform a hash operation on the post-calculation data received via the connection path 170. The hash processing unit 150 updates the hash value stored in the internal buffer 158 for each post-calculation data of the second calculation unit.

The control unit 130 repeats steps S113 to S119 multiple times. The transfer unit 120 reads the hash value calculated by the hash processing unit 150 for the entire post-calculation data (step S120) and writes it to the storage unit 110 (step S121). In this way, the storage unit 110 outputs a hash value corresponding to the entire post-calculation data that has been calculated from the entire pre-calculation data.

Next, the effect of this embodiment will be explained. The semiconductor device 1 of this embodiment outputs the post-calculation data generated by the encryption processing unit 140 to the hash processing unit 150. This allows the calculation processing of the encryption processing unit 140 and the hash operation processing of the hash processing unit 150 to be performed in parallel. Therefore, it is possible to speed up the processing of the semiconductor device 100.

For example, if the calculation processing of the encryption processing unit 140 and the hash operation processing of the hash processing unit 150 are performed individually like the semiconductor device 1 of the comparative example, the time required for AES decryption and the time required for SHA operation will be calculated separately. However, by performing them in parallel as in this embodiment, for example, the process with a short required time can be performed during the execution of the process with a long required time, which can be expected to reduce the processing time.

In addition, since the semiconductor device 100 has a connection path 170 connecting the encryption processing unit 140 and the hash processing unit 150, it can speed up the transfer of post-calculation data. Also, the semiconductor device 100 has a control circuit 146 that switches the output destination of the post-calculation data to only the bus 160 or the bus 160 and the connection path 170. Therefore, depending on the situation, the output destination of the post-calculation data can be changed to enable high-speed processing.

Furthermore, the hash processing unit 150 has a selection circuit 156 that switches whether to perform a hash operation on the post-calculation data received via the bus 160 or the post-calculation data received via the connection path 170. Therefore, depending on the situation, the reception destination of the post-calculation data can be changed to enable high-speed processing.

In addition, the hash processing unit 150 has a monitor 157 that monitors the storage status of the buffer 154. Therefore, depending on the storage status of the buffer 154, the output of the post-calculation data from the encryption processing unit 140 can be stopped, which can suppress overflow of the buffer 154.

First Modified Example

Figure 6:
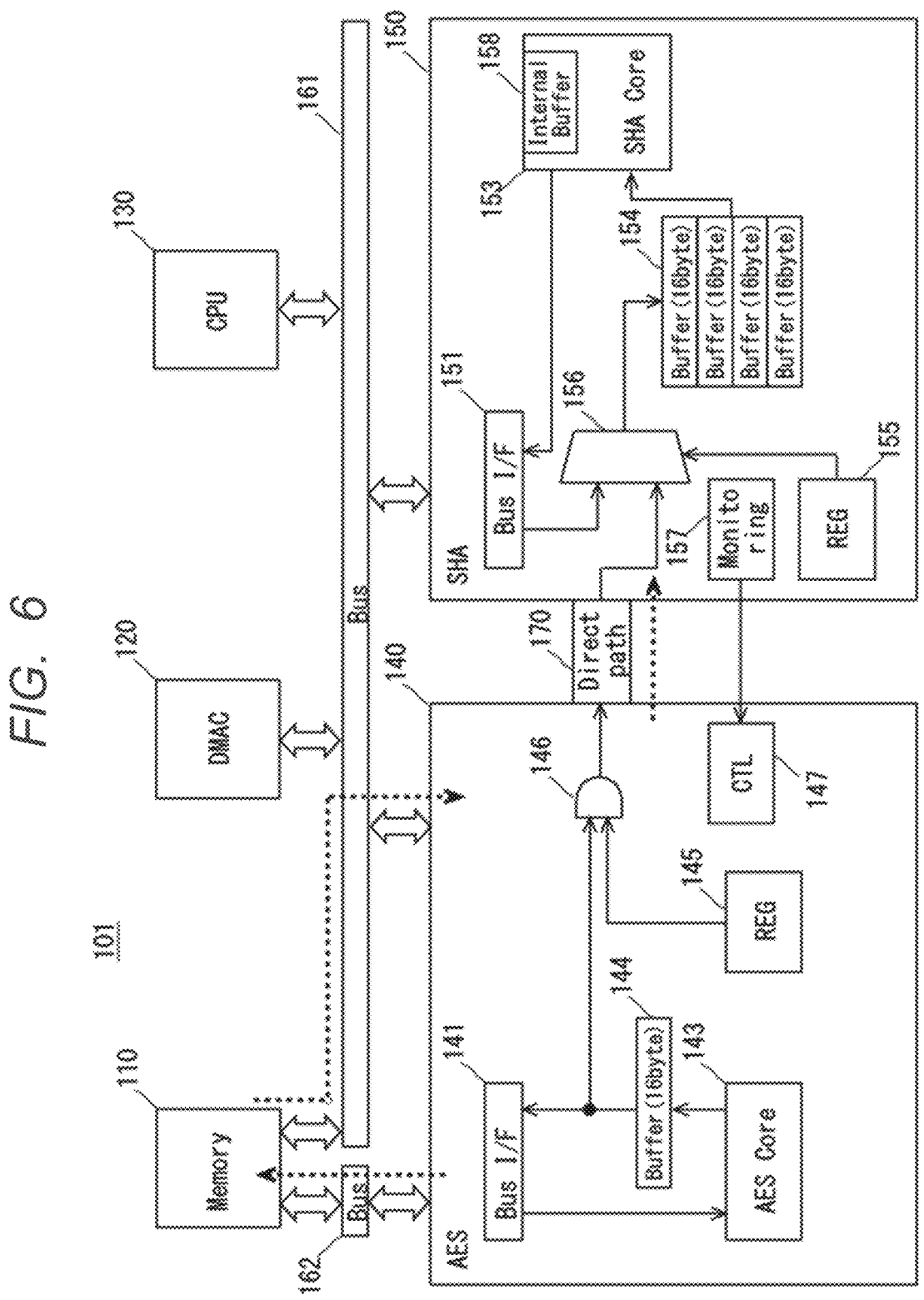
FIG. 6 is a block diagram illustrating a semiconductor device according to the first modified example of the first embodiment.

Next, the first modified example of the first embodiment will be explained. The semiconductor device of this modified example includes multiple buses. FIG. 6 is a block diagram illustrating a semiconductor device 101 according to the first modified example of the first embodiment. As shown in FIG. 6, the semiconductor device 101 of this modified example includes buses 161 and 162. In other words, it includes buses 161 and 162 instead of the bus 160 of the first embodiment. Bus 161 is different from bus 162.

Bus 161 is a path through which pre-calculation data is transferred from the storage unit 110 to the encryption processing unit 140. Bus 162 is a path through which post-calculation data is transferred from the encryption processing unit 140 to the storage unit 110.

According to this modified example, it is possible to make the bus 161 transferring the pre-calculation data from the storage unit 110 to the encryption processing unit 140 and the bus 162 transferring the post-calculation data from the encryption processing unit 140 to the storage unit 110 different. Therefore, it is possible to transfer pre-calculation data and post-calculation data via dedicated buses, respectively, which can speed up the processing. Also, it is possible to suppress the mutual influence of the pre-calculation data and the post-calculation data.

Second Modified Example

Figure 7:
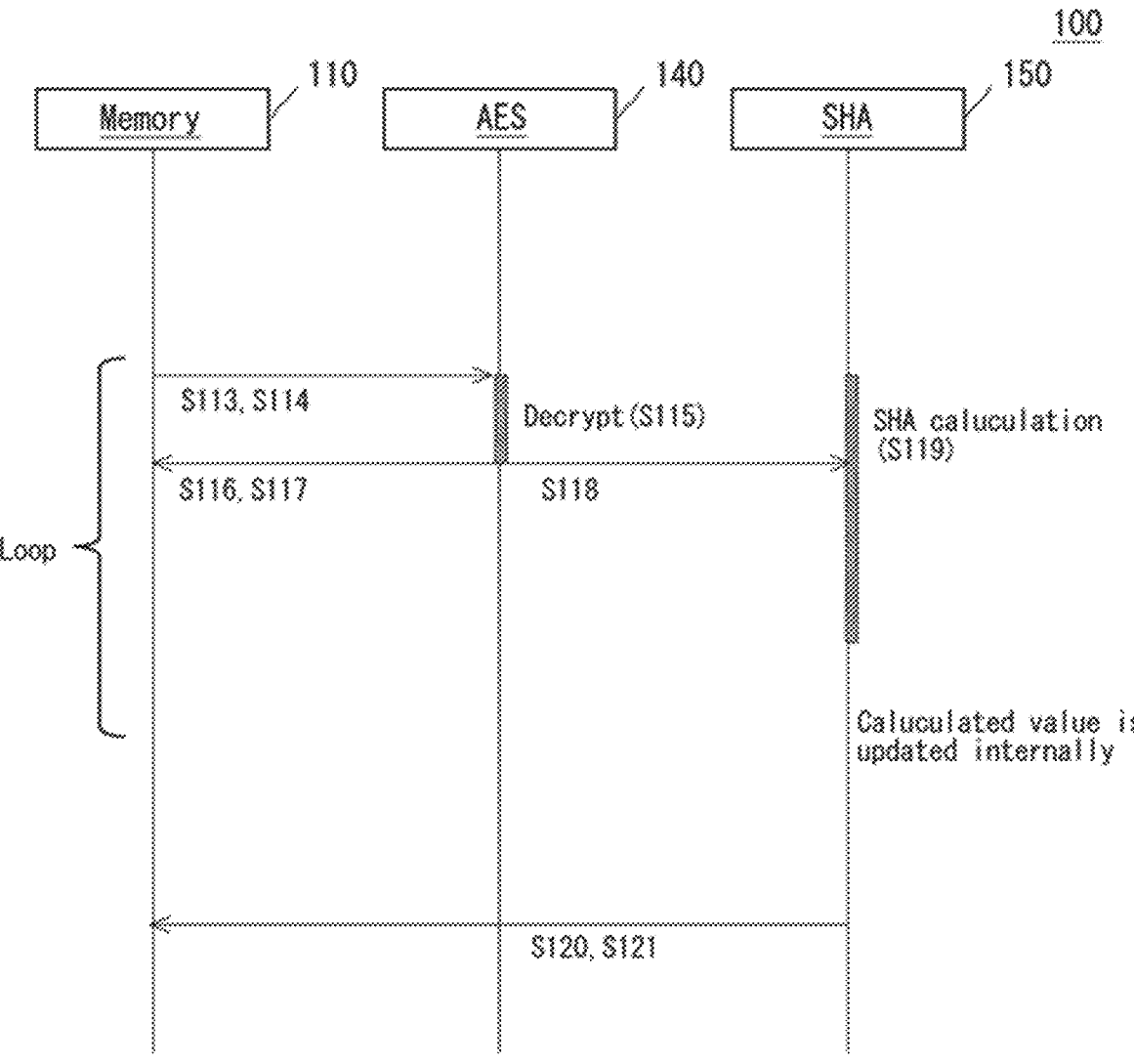
FIG. 7 is a sequence diagram illustrating the main portion in the operation of the semiconductor device of the first embodiment.
Figure 8:
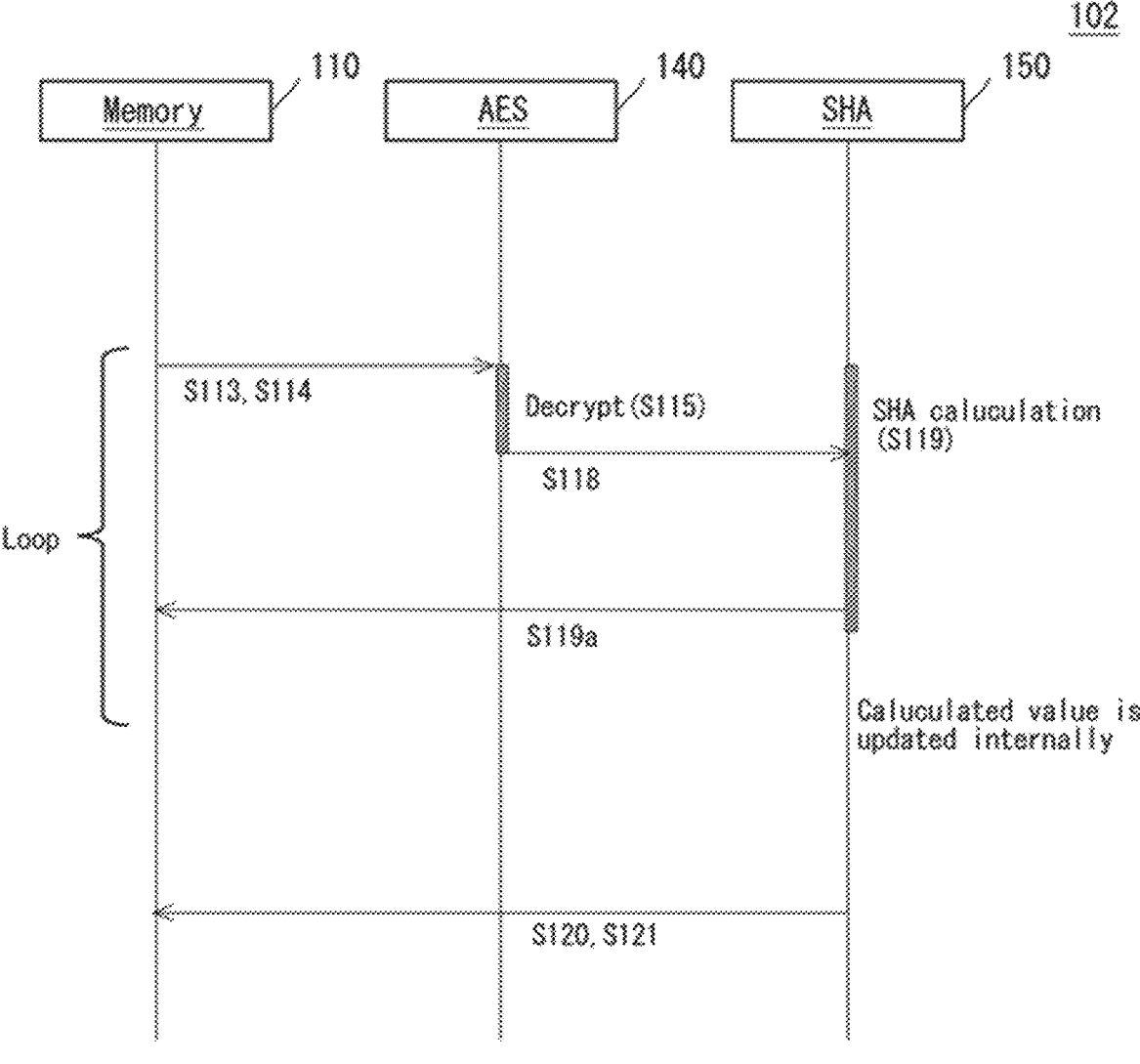
FIG. 8 is a sequence diagram illustrating the main portion in the operation of the semiconductor device according to the second modified example of the first embodiment.

Next, the second modified example of the first embodiment will be explained. In this modified example, the memory section 110 is transferred the post-calculation data of the first calculation unit from the encryption processing section 140, instead, it is transferred the post-calculation data of the second calculation unit from the hash processing section 150. FIG. 7 is a sequence diagram illustrating the main portion of the operation of the semiconductor device 100 of the first embodiment. FIG. 8 is a sequence diagram illustrating the main portion of the operation of the semiconductor device 102 related to the second modified example of the first embodiment. FIG. 7 is a diagram for comparison with this modified example.

As shown in FIG. 7, in the aforementioned semiconductor device 100, the control section 130 causes the transfer section 120 to transfer the post-calculation data of the first calculation unit from the encryption processing section 140 to the memory section 110 (steps S116 and S117). Therefore, the post-calculation data of the first calculation unit is transferred to the memory section 110.

On the other hand, as shown in FIG. 8, in the semiconductor device 102 of this modified example, the control section 130 causes the transfer section 120 to transfer the post-calculation data of the second calculation unit from the hash processing section 150 to the memory section 110 (step S119a). Therefore, the post-calculation data of the second calculation unit is transferred to the memory section 110.

According to this modified since the post-calculation data of the second calculation unit is transferred from the hash processing section 150, the frequency at which the memory section 110 is transferred the post-calculation data can be reduced. Therefore, the efficiency of processing can be improved.

Second Embodiment

Figure 9:
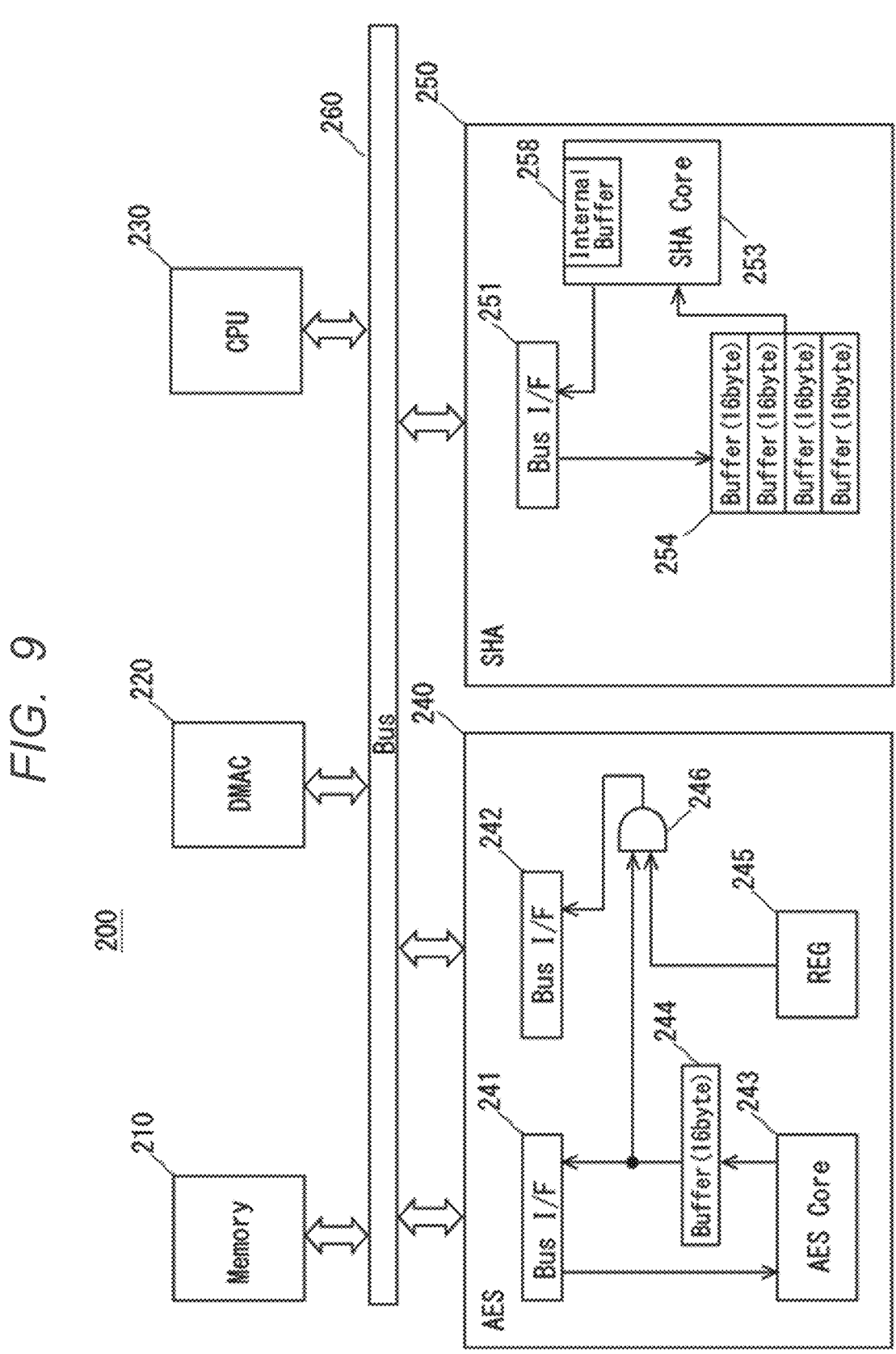
FIG. 9 is a block diagram illustrating a semiconductor device according to the second embodiment.

Next, the semiconductor device of the second embodiment will be explained. The semiconductor device of this embodiment uses multiple bus ports instead of the connection path 170 of the first embodiment. FIG. 9 is a block diagram illustrating the semiconductor device 200 according to the second embodiment. As shown in FIG. 9, the semiconductor device 200 includes a memory section 210, a transfer section 220, a control section 230, an encryption processing section 240, a hash processing section 250, and a bus 260.

The memory section 210, the transfer section 220, the control section 230, and the bus 260 each have the same functions as the aforementioned memory section 110, transfer section 120, control section 130, and bus 160.

The encryption processing section 240 includes a bus port 241, a bus port 242, an AES core 243, a buffer 244, a register 245, and a control circuit 246. The encryption processing section 240, compared to the aforementioned encryption processing section 140, is equipped with multiple bus ports 241 and 242, and the output destination of the control circuit 246 is different. Specifically, the output destination of the control circuit 246 is the bus port 242. Therefore, the control circuit 246 outputs the post-calculation data of the first calculation unit generated by the encryption processing section 240 to the bus port 242 depending on the value of the register 245. The bus port 242 outputs the post-calculation data of the first calculation unit to the bus 260.

In this way, the encryption processing section 240 has a switching means for switching between a mode in which the post-calculation data is output only to either of the bus ports 241 and 242 according to a predetermined setting, and a mode in which the post-calculation data is output to both the bus ports 241 and 242. The switching means includes, for example, the control circuit 246.

The post-calculation data output from the bus port 241 to the bus 260 is transferred to the memory section 210. The post-calculation data output from the bus port 242 to the bus 260 is transferred to the hash processing section.

The hash processing section 250 includes a bus port 251, a SHA core 253, a buffer 254, and an internal buffer 258. The hash processing section 250, compared to the aforementioned hash processing section 150, does not have a selection circuit 156 between the bus port 251 and the buffer 254. Therefore, the post-calculation data is stored in the buffer 254 via the bus port 251 from the bus 260. The hash processing unit 250 performs hash operation processing on the operation processed data received via the bus port 242 and bus 260.

According to the semiconductor device 200 of the present embodiment, the encryption processing unit 240 has bus ports 241 and 242, so it can separate either the input of operation processing pre-data from the storage unit 210, the output of operation processing post-data to the storage unit 210, and the output of operation processing post-data to the hash processing unit 250. This allows parallel input and output of each data via different bus ports. Therefore, the processing of the semiconductor device 200 can be accelerated.

First Modified Example

Figure 10:
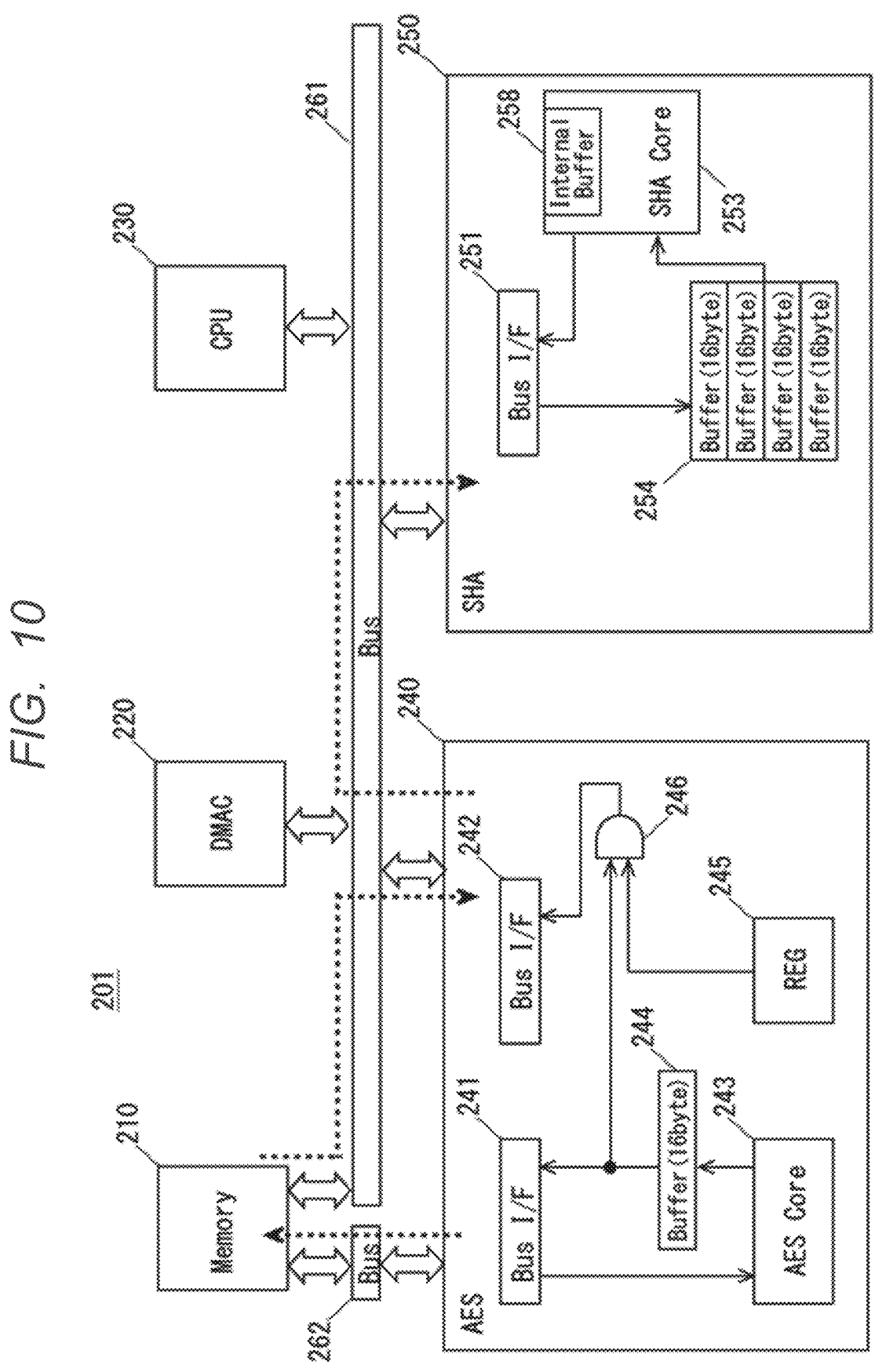
FIG. 10 is a block diagram illustrating a semiconductor device according to the first modified example of the second embodiment.

Next, the first modified example of the second embodiment will be described. The semiconductor device of this modified example includes multiple buses. FIG. 10 is a block diagram illustrating the semiconductor device 201 according to the first modified example of the second embodiment. As shown in FIG. 10, the semiconductor device 201 of this modified example includes buses 261 and 262. In other words, it includes buses 261 and 262 instead of bus 260 of the second embodiment. Bus 261 is different from bus 262.

Bus 261 serves as a route for transferring operation processing pre-data from the storage unit 210 to the encryption processing unit 240 and for transferring operation processing post-data from the encryption processing unit 240 to the hash processing unit 250. Bus 262 serves as a route for transferring operation processing post-data from the encryption processing unit 240 to the storage unit 210. The transfer of operation processing pre-data from the storage unit 210 to the encryption processing unit 240, the transfer of operation processing post-data from the encryption processing unit 240 to the hash processing unit 250, and the transfer of operation processing post-data from the encryption processing unit 240 to the storage unit 210 may each select the most suitable bus 261 and 262 as appropriate for high-speed processing depending on the situation.

According to this modified example, it is possible to differentiate between bus 261, which transfers operation processing pre-data to the encryption processing unit 240 and operation processing post-data to the hash processing unit 250, and bus 262, which transfers operation processing post-data from the encryption processing unit 240 to the storage unit 210. Therefore, it is possible to transfer operation processing pre-data and operation processing post-data via dedicated buses, and the processing of the semiconductor device 201 can be accelerated.

The disclosure made by the present inventor has been specifically described based on the embodiments, but this disclosure is not limited to the embodiments and the modified examples, and it goes without saying that various changes can be made without departing from the spirit thereof. For example, as shown below, a control program for executing the control method of the semiconductor device on a computer is also within the scope of the technical idea of the embodiment and the modified example. The storage units 110 and 210 may store a program for the processing performed by each component of the semiconductor devices 100 and 200, etc. The control units 130 and 230 may load the program from the storage units 110 and 210 into memory and execute the program. This allows the control units 130 and 230 to realize the functions of each component in the semiconductor devices 100 and 200, etc.

The control program of the semiconductor device may be stored in a non-temporary computer-readable medium or a tangible storage medium. Not limited to, but as an example, the computer-readable medium or tangible storage medium may include random-access memory (RAM), read-only memory (ROM), flash memory, solid-state drive (SSD) or other memory technologies, CD-ROM, digital versatile disc (DVD), Blu-ray (registered trademark) disc or other optical disc storage, magnetic cassette, magnetic tape, magnetic disk storage or other magnetic storage devices. The time measurement program may be transmitted on a temporary computer-readable medium or communication medium. Not limited to, but as an example, the temporary computer-readable medium or communication medium may include electrical, optical, acoustic, or other forms of propagation signals.

Additional Statement 1

A control program for a semiconductor device, comprising: a storage section for storing at least one of plaintext and ciphertext, a cryptographic processing section for performing computational processing including encryption of the plaintext and decryption of the ciphertext, a hash processing section with a buffer, which performs hash calculation processing to calculate a hash value, wherein the control program for the semiconductor device includes: a first step of transferring pre-computation data containing at least one of the plaintext and the ciphertext stored in the storage section to the cryptographic processing section for each first computation unit, a second step of applying the computational processing to the transferred first computation unit of the pre-computation data in the cryptographic processing section, and generating a first computation unit of post-computation data containing at least one of the ciphertext and the plaintext, a third step of transferring the generated first computation unit of the post-computation data to the hash processing section, a fourth step of storing the transferred first computation unit of the post-computation data in the buffer of the hash processing section, a fifth step of applying the hash calculation processing to the second computation unit of the post-computation data in the hash processing section, a sixth step of transferring the first computation unit of the post-computation data to the second computation unit of the post-computation data to the storage section, executing these steps on a computer, performing the second step and the fifth step in parallel, repeating the first step to the fifth step multiple times, and further executing on a computer a step of outputting the hash value corresponding to the post-computation data that the pre-computation data has been computed to the storage section.

Additional Statement 2

In the above semiconductor device, the semiconductor device further includes a bus that connects the storage section, the cryptographic processing section, and the hash processing section to each other for communication, and a connection path that connects the cryptographic processing section and the hash processing section for communication, which is different from the bus, wherein in the third step, the first computation unit of the post-computation data is output to the connection path, in the sixth step, the first computation unit of the post-computation data is output to the bus, and in the fifth step, the hash calculation processing is performed on the post-computation data received via the connection path in the hash processing section, the control program for the semiconductor device according to additional statement 1.

Additional Statement 3

The cryptographic processing section has a switching means for switching between a mode in which the post-computation data is output only to the bus according to a predetermined setting, and a mode in which the post-computation data is output to both the bus and the connection path, the control program for the semiconductor device according to additional statement 2.

Additional Statement 4

The hash processing section has a switching means for switching between a mode in which the hash calculation processing is performed on the post-computation data received via the bus according to a predetermined setting, and a mode in which the hash calculation processing is performed on the post-computation data received via the connection path, the control program for the semiconductor device according to additional statement 2.

Additional Statement 5

The hash processing section has a monitor for monitoring the storage status of the buffer, which outputs a wait signal to the cryptographic processing section when additional post-computation data cannot be stored in the buffer, the cryptographic processing section has a controller that stops outputting the post-computation data to at least one of the bus and the connection path when the wait signal is received, the control program for the semiconductor device according to additional statement 4.

Additional Statement 6

The bus is, In the above semiconductor device, a first bus that transfers pre-calculation processing data from the memory section to the encryption processing section, and a second bus, different from the first bus, that transfers post-calculation processing data from the encryption processing section to the memory section, are included in the control program of the semiconductor device described in the additional statement 2.

Additional Statement 7

In the above semiconductor device, the memory section, the encryption processing section, and the hash processing section are further provided with a bus that can communicate with each other. The encryption processing section includes multiple bus ports that perform input of pre-calculation processing data and output of post-calculation processing data between the bus. The multiple bus ports include a first bus port and a second bus port. In the sixth step, the post-calculation processing data output from the first bus port to the bus is transferred to the memory section. In the third step, the post-calculation processing data output from the second bus port to the bus is transferred to the hash processing section. In the fifth step, the hash processing section performs hash calculation processing on the post-calculation processing data received via the second bus port and the bus. This is the control program of the semiconductor device described in the additional statement 1.

Additional Statement 8

The encryption processing section has a switching means that switches between a mode in which the post-calculation processing data is output only to either the first bus port or the second bus port according to a predetermined setting, and a mode in which the post-calculation processing data is output to both the first bus port and the second bus port. This is the control program of the semiconductor device described in the additional statement 7.

Additional Statement 9

The bus includes a first bus that transfers pre-calculation processing data from the memory section to the encryption processing section and post-calculation processing data from the encryption processing section to the hash processing section, and a second bus, different from the first bus, that transfers post-calculation processing data from the encryption processing section to the memory section. This is the control program of the semiconductor device described in the additional statement 7.

Additional Statement 10

In the above semiconductor device, a transfer section that performs transfer of pre-calculation processing data and post-calculation processing data, and a control section that controls the memory section, the encryption processing section, and the hash processing section, are further provided. This is the control program of the semiconductor device described in the additional statement 1.

What is claimed is:

1. A semiconductor device comprising:
   a memory circuit configured to store pre-calculation data including at least one of plaintext and ciphertext;
   an encryption processing circuit configured to perform crypt processing including encryption processing of the plaintext and decryption processing of the ciphertext;
   a hash processing circuit including a buffer and configured to perform hash calculation processing to calculate a hash value;
   a bus configured to connect the memory circuit, the encryption processing circuit, and the hash processing circuit to communicate with one another; and an alternative connection path configured to connect the encryption processing circuit and the hash processing circuit to communicate with each other,
   wherein the semiconductor device is configured to transfer, from the memory circuit to the encryption processing circuit, the pre-calculation data for each first calculation unit of the encryption processing circuit,
   wherein the encryption processing circuit is configured to apply the crypt processing to the transferred pre-calculation data for the first calculation unit, generate post-calculation data for the first calculation unit, and transfer the generated post-calculation data for the first calculation unit to the hash processing circuit, the post-calculation data including at least one of the ciphertext and the plaintext,
   wherein the hash processing circuit is configured to store the post-calculation data for the first calculation unit in the buffer, and apply the hash calculation processing to the post-calculation data for each second calculation unit of the hash processing circuit,
   wherein the semiconductor device is configured to transfer the post-calculation data for the first calculation unit or the post-calculation data for the second calculation unit to the memory circuit,
   wherein the crypt processing and the hash calculation process are performed in parallel,
   wherein the crypt processing, the hash calculation process, and the transfer of the post-calculation data to the memory circuit are performed repeatedly multiple times,
   wherein the hash processing circuit is configured to output, to the memory circuit, the hash value corresponding to the post-calculation data obtained by applying the crypt processing to the pre-calculation data,
   wherein the semiconductor device is configured to switch a transfer mode between a first mode and a second mode,
   wherein, in the first mode, the encryption processing circuit transfers the post-calculation data to the hash processing circuit only via the bus, and
   wherein, in the second mode, the encryption processing circuit transfers the post-calculation data to the hash processing circuit via the bus and the alternative connection path.

2. The semiconductor device according to claim 1,
   wherein the semiconductor device is further configured to switch a hash processing mode between a third mode and a fourth mode,
   wherein, in the third mode, the hash processing circuit applies the hash calculation processing to the post-calculation data received via the bus, and
   wherein, in the fourth mode, the hash processing circuit applies the hash calculation processing to the post-calculation data received via the alternative connection path.

3. The semiconductor device according to claim 2,
   wherein the hash processing circuit includes a detecting circuit configured to detect a status of the buffer and output a waiting signal to the encryption processing circuit when the status indicates that the buffer is not capable of storing the post-calculation data, and
   wherein the encryption processing circuit includes a controller circuit configured to, when the waiting signal is received, stop transferring the post-calculation data to at least one of the bus or the alternative connection path.

4. The semiconductor device according to claim 1, wherein the bus comprises a first and a second bus, wherein the first bus is configured to transfer the pre-calculation data from the memory circuit to the encryption processing circuit, and wherein the second bus is configured to transfer the post-calculation data from the encryption processing circuit to the memory circuit.

5. The semiconductor device according to claim 1, wherein the encryption processing circuit includes a plurality of bus ports configured to input the pre-calculation data and output the post-calculation data via the bus, wherein the bus ports include a first bus port and a second bus port, wherein the post-calculation data outputted via the first bus port are transferred to the memory circuit, wherein the post-calculation data outputted via the second bus port are transferred to the hash processing circuit, and wherein the hash processing circuit applies the hash calculation processing to the post-calculation data received via the second bus port and the bus.

6. The semiconductor device according to claim 5, wherein the semiconductor device is further configured to switch the transfer mode between a fifth mode and a sixth mode, wherein, in the fifth mode, the encryption processing circuit transfers the post-calculation data only via either one of the first bus port or the second bus port, and wherein, in the sixth mode, the encryption processing circuit transfers the post-calculation data via the first bus port and the second bus port.

7. The semiconductor device according to claim 5, wherein the bus comprises a first and a second bus, wherein the first bus is configured to transfer the pre-calculation data from the memory circuit to the encryption processing circuit, and transfer the post-calculation data from the encryption processing circuit to the hash processing circuit, and wherein the second bus is configured to transfer the post-calculation data from the encryption processing circuit to the memory circuit.

8. The semiconductor device according to claim 1, further comprises:

a transfer circuit configured to perform the transfer of the pre-calculation data and the post-calculation data; and a control circuit configured to control the memory circuit, the encryption processing circuit and the hash processing circuit.

9. A method for encryption processing, the method comprising:

(a) transferring pre-calculation data from a memory device to an encryption processing device for each first processing unit;

(b) generating post-calculation data for the first processing unit by performing an encryption process the pre-calculation data for the first processing unit;

(c) transferring the post-calculation data to a hash processing device;

(d) storing, in a buffer of the hash processing device, the post-calculation data for the first processing unit;

(e) generating a hash value by performing a hash processing on post-calculation data for a second processing unit stored in the buffer of the hash processing device;

(f) transferring the post-calculation data for the first processing unit or the post-calculation data for the second processing unit to the memory device;

(g) storing the hash value corresponding the post-calculation data, wherein (b) and (e) are performed in parallel, wherein (a), (b), (c), (d) and (e) are performed repeatedly multiple times, wherein (c) is performed by outputting the post-calculation data of the first processing unit to a connection path configured to communicate from the encryption processing device to the hash processing device, wherein (f) is performed by outputting the post-calculation data for the first processing unit to a bus configured to provide bidirectional communicate among the memory device, the encryption processing device, and the hash processing device, wherein (e) is performed by applying the hash processing to the post-calculation data received via the connection path, wherein the method further comprises (h) switching a transfer mode between a first mode and a second mode, wherein, in the first mode, the encryption processing device transfers the post-calculation data the hash processing device only via the bus, and wherein, in the second mode, the encryption processing device transfers the post-calculation data to the hash processing device via the bus and the connection path.

10. The method according to claim 9, further comprises:

(i) switching a hash processing mode between a third mode and a fourth mode, wherein, in the third mode, the hash processing device applies the hash calculation process to the calculated post-calculation data received via the bus, and wherein, in the fourth mode, the hash processing circuit applies the hash calculation process to the post-calculation data received via the connection path.

11. The method according to claim 10, wherein the hash processing device includes a detecting device configured to detect a status of the buffer and output a waiting signal to the encryption processing device when the status indicates that the buffer is not capable of storing the post-calculation data, and wherein the encryption processing device includes a controller device configured to, when the waiting signal is received, stop transferring the post-calculation data to at least one of the bus or the connection path.

12. The method according to claim 9, wherein the bus comprises a first and a second bus, wherein the first bus is configured to transfer the pre-calculation data from the memory device to the encryption processing device, and transfer the post-calculation data from the encryption processing device to the hash processing device, and wherein the second bus is configured to transfer the post-calculation data from the encryption processing device to the memory device.

13. The method according to claim 9, wherein the encryption processing device includes a plurality of bus ports configured to input the pre-calculation data and output the post-calculation data with the bus, wherein the bus ports include a first bus port and a second bus port, wherein (f) is performed by transferring the post-calculation data outputted via the first bus port to the memory device, wherein (c) is performed by transferring the post-calculation data outputted via the second bus port to the hash processing device, and wherein (e) is performed by applying the hash calculation processing to the post-calculation data received via the second bus port and the bus.

14. The method according to claim 13, wherein the encryption processing device is configured to switch a transfer mode between a fifth mode and a sixth mode, wherein, in the fifth mode, the encryption processing device transfers the post-calculation data only via either one of the first bus port or the second bus port, and wherein, in the sixth mode, the encryption processing device transfers the post-calculation data via the first bus port and the second bus port.

15. The method according to claim 13, wherein the bus comprises a first and a second bus, wherein the first bus is configured to transfer the pre-calculation data from the memory device to the encryption processing device, and transfer the post-calculation data from the encryption processing device to the hash processing device, and wherein the second bus is configured to transfer the post-calculation data from the encryption processing device to the memory device.

\*    \*    \*    \*    \*